July 11, 1944.  L. YOST  2,353,534
OIL WELL DRILLING UNIT
Filed May 1, 1941
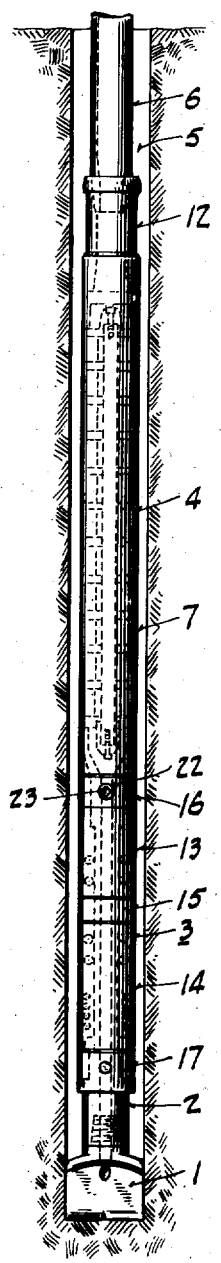
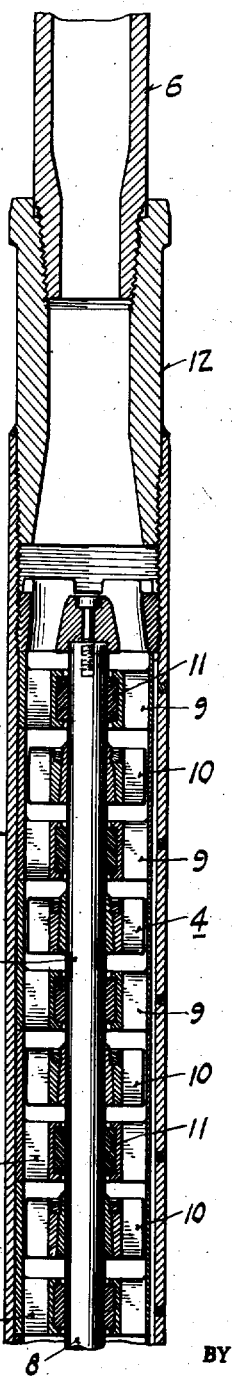
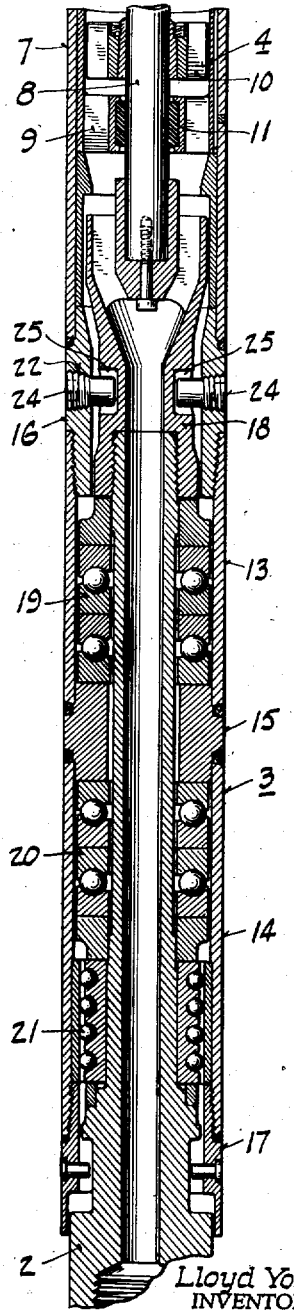
Lloyd Yost
INVENTOR.
ATTORNEY Patented July 11, 1944

2,353,534

UNITED STATES PATENT OFFICE 2,353,534

OIL WELL DRILLING UNIT

Lloyd Yost, Los Angeles, Calif., assignor to A. O. Smith Corporation, Milwaukee, Wis., a corporation of New York Application May 1, 1941, Serial No. 391,333

1 Claim. (Cl. 255—4)

This invention relates to an oil well drilling unit of the type employing a mud turbine at the bottom of the well for rotating the drill.

The present invention is related to the following co-pending applications by the same inventor: Ball thrust bearing for well drilling units, Serial No. 391,335, filed May 1, 1941; Safety collar for drills, Serial No. 391,334, filed May 1, 1941; Radial ball bearings, Serial No. 391,339, filed May 1, 1941; and also to an application Serial No. 391,338, filed May 1, 1941, by G. D. Dilley, for Turbine driven well drilling units and assigned to a common assignee herewith. It utilizes and combines certain of the more detailed features of the inventions set forth in said applications as well as other features to provide a unit which is more economical to manufacture and service and which is more practical.

The principal object of the invention is to provide a unit in which the parts most subject to wear are more easily assembled and disassembled for repair and replacement purposes.

A more specific object is to provide a unit of the type referred to in which the main radial and thrust bearings for the turbine shaft are grouped into a separable unit at the lower end of the turbine and between the turbine and the drill.

An embodiment of the invention is illustrated in the accompanying drawing in which:

Figure 1 is a side elevation of the unit in a well;

Fig. 2 is a vertical section through the upper end of the turbine; and

Fig. 3 is a similar section through the lower end of the turbine and bearings.

The unit comprises, in general, a drill 1, drill shaft 2, coupling 3 containing the main bearings, and turbine 4. The turbine 4 is suspended in the well 5 by drill tubing 6 through which mud is pumped from the top of the well for driving the turbine.

The turbine 4 comprises a tubular housing 7 and a central rotary shaft 8. Suitable stator guides 9 are secured to the housing 7 and rotor runners 10 to the shaft 8 to provide the required torque from the motive fluid. Each guide 9 carries a radial bearing 11 for the shaft 8. The specific construction of the stator and rotor and of the turbine assembly is set forth in co-pending applications, Serial No. 391,336, filed May 1, 1941, and Serial No. 391,337, filed May 1, 1941, by the present inventor.

The upper end of shaft 8 is free from main bearings, as shown in Fig. 2 and the upper end of the housing 7 is threaded and also preferably welded to a nipple 12 to which the drill tubing 6 is threaded.

The coupling 3 is co-axial with the shaft 2 and comprises tubular casing members 13 and 14 having their adjacent ends welded to a thrust ring 15. The member 13 has its upper end threaded to a locking ring 16 which is welded to the lower end of the turbine housing 7. The threaded joint is left hand where the rotor shaft 8 turns clockwise so that turning of the shaft transmits forces through the bearings which tend to tighten the threads. The lower end of member 14 may have threaded thereto a retaining collar 17 which forms the subject above referred to.

The shaft 2 is threaded to a locking member 18 by a right hand thread so that the threads tighten as the shaft 2 is rotated by shaft 8 to which the member 18 is secured. The lower end of shaft 2 is threaded to receive the threaded end of the drill 1.

Between casings 13 and 14 and shaft 2 are respectively a downward ball thrust bearing 19 and an upward ball thrust bearing 20 separated by the thrust ring 15 which constitutes an abutment for each of the thrust bearings. A radial ball bearing 21 below the thrust bearing 20 is also housed within the casing 14. Any suitable thrust bearings may be employed. The thrust bearings 19 and 20 illustrated, constitute the subject of application, Serial No. 391,335, above referred to.

The coupling 3 is constructed to provide ready removal of the bearings from its opposite ends for repair purposes. For the purpose of unthreading the shaft 2 from the member 18 at the end of shaft 8, the ring 16 is provided with one or more threaded openings 22 which are normally closed by plugs 23. When it is desired to unthread the bearing coupling 3 from turbine 4, the plugs are removed and threaded pins 24 are inserted extending into recesses 25 in the member 18. This prevents turning of the member 18 relative to the ring 16 and by unthreading shaft 2 from member 18 the shaft may be removed with bearings 20 and 21. The retaining collar 17 should be unthreaded from casing 14 at the same time. Access to bearing 19 may then be had by unscrewing casing 13 from ring 16.

The invention provides all of the main bearings for the unit in a coupling member between the turbine and the drill with auxiliary radial bearings at each stage of the turbine. When inspecting or repairing the main bearings, it is not necessary, as heretofore, to disassemble the entire turbine. By placing the main bearings between the turbine and the drill, the turbine is protected from shocks from the drill.

Various embodiments of the invention may be employed within the scope of the claim.

The invention is claimed as follows:

In an oil well drilling unit, a drill, a turbine for driving said drill and having a cylindrical housing with spaced stator guides therein, a shaft disposed axially of the housing with spaced rotor runners thereon intermediate said stator guides, a bearing casing removably secured to the lower end of said housing, an upward and a downward thrust bearing in said casing, a bearing shaft disposed axially of said casing and removably secured to the lower end of said turbine shaft with said end constituting an abutment for said downward thrust bearing, said bearing shaft having a shoulder at its lower end constituting said abutment for an upward thrust bearing and being secured to said drill, a permanently fixed abutment extending radially inwardly from said bearing casing centrally thereof and intermediate said thrust bearings to receive the thrust therefrom, and a radial bearing in said casing for said bearing shaft, said bearing shaft being removable downwardly through said casing and said bearings being removable through the respective ends of said casing.

LLOYD YOST.

CERTIFICATE OF CORRECTION.

Patent No. 2,353,534.                                                                 July 11, 1944.

LLOYD YOST.

It is hereby certified that error appears in the printed specification of the above numbered patent requiring correction as follows: Page 2, second column, lines 4 and 5, for the words "said abutment for an" read --an abutment for said--; and that the said Letters Patent should be read with this correction therein that the same may conform to the record of the case in the Patent Office.

Signed and sealed this 5th day of September, A. D. 1944.

Leslie Frazer (Seal)
                            Acting Commissioner of Patents.

not necessary, as heretofore, to disassemble the entire turbine. By placing the main bearings between the turbine and the drill, the turbine is protected from shocks from the drill.

Various embodiments of the invention may be employed within the scope of the claim.

The invention is claimed as follows:

In an oil well drilling unit, a drill, a turbine for driving said drill and having a cylindrical housing with spaced stator guides therein, a shaft disposed axially of the housing with spaced rotor runners thereon intermediate said stator guides, a bearing casing removably secured to the lower end of said housing, an upward and a downward thrust bearing in said casing, a bearing shaft disposed axially of said casing and removably secured to the lower end of said turbine shaft with said end constituting an abutment for said downward thrust bearing, said bearing shaft having a shoulder at its lower end constituting said abutment for an upward thrust bearing and being secured to said drill, a permanently fixed abutment extending radially inwardly from said bearing casing centrally thereof and intermediate said thrust bearings to receive the thrust therefrom, and a radial bearing in said casing for said bearing shaft, said bearing shaft being removable downwardly through said casing and said bearings being removable through the respective ends of said casing.

LLOYD YOST.

CERTIFICATE OF CORRECTION.

Patent No. 2,353,534.

July 11, 1944.

LLOYD YOST.

It is hereby certified that error appears in the printed specification of the above numbered patent requiring correction as follows: Page 2, second column, lines 4 and 5, for the words "said abutment for an" read --an abutment for said--; and that the said Letters Patent should be read with this correction therein that the same may conform to the record of the case in the Patent Office.

Signed and sealed this 5th day of September, A. D. 1944.

Leslie Frazer (Seal)

Acting Commissioner of Patents.